US010684920B2

(12) United States Patent
Saladi et al.

(10) Patent No.: US 10,684,920 B2
(45) Date of Patent: Jun. 16, 2020

(54) OPTIMIZED AND CONSISTENT REPLICATION OF FILE OVERWRITES (71) Applicant: QUEST SOFTWARE INC., Aliso Viejo, CA (US)

(72) Inventors: Naresh Saladi, Santa Clara, CA (US); Murali Bashyam, Fremont, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 553 days.

(21) Appl. No.: 14/842,693

(22) Filed: Sep. 1, 2015

(65) Prior Publication Data
US 2017/0060957 A1 Mar. 2, 2017

(51) Int. Cl.
G06F 16/30 (2019.01)
G06F 11/14 (2006.01)
G06F 16/182 (2019.01)
G06F 16/174 (2019.01)

(52) U.S. Cl.
CPC ...... G06F 11/1453 (2013.01); G06F 11/1448 (2013.01); G06F 16/1748 (2019.01); G06F 16/184 (2019.01)

(58) Field of Classification Search
CPC ... G06F 16/282; G06F 16/1748; G06F 16/184
USPC ........ 707/607, 609, 687, 705, 709, 813, 821
See application file for complete search history.

(56) References Cited

U.S. PATENT DOCUMENTS

| | | | | |
|---|---|---|---|---|
| 2010/0191884 | A1* | 7/2010 | Holenstein | G06F 11/2094 710/200 |
| 2014/0371109 | A1* | 12/2014 | McMillen | H01L 21/76886 506/38 |
| 2015/0058294 | A1* | 2/2015 | Akirav | G06F 16/1748 707/640 |
| 2015/0127687 | A1* | 5/2015 | Graves | G06F 16/282 707/803 |

* cited by examiner

Primary Examiner — Sana A Al-Hashemi
(74) Attorney, Agent, or Firm — Maschoff Brennan (57) ABSTRACT In general, certain embodiments of the present disclosure provide techniques or mechanisms for creating efficient and consistent replication of file overwrites. According to various embodiments, a file map with a sequence file number is created for a data file on a source. The file map includes one or more nodes that each include a sequence node number. When an entry in the file map is changed, the sequence file number is incremented, and the corresponding node is updated by, among other things, setting the sequence node number to equal the current sequence file number. All other nodes in the file map that point to the updated node are similarly updated. When replication occurs, only the updated nodes in the file map are replicated and any unreplicated non-updated nodes are maintained.

20 Claims, 7 Drawing Sheets

OPTIMIZED AND CONSISTENT REPLICATION OF FILE OVERWRITES

TECHNICAL FIELD

The present disclosure relates generally to data storage, and more specifically to replications and overwrites within network-accessible or network-attached storage systems.

DESCRIPTION OF RELATED ART

Data is often stored in storage systems that are accessed via a network. Network-accessible storage systems allow potentially many different client devices to share the same set of storage resources. A network-accessible storage system can perform various operations that render storage more convenient, efficient, and secure. For instance, a network-accessible storage system can receive and retain potentially many versions of backup data for files stored at a client device. As well, a network-accessible storage system can serve as a shared file repository for making a file or files available to more than one client device.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. Different storage systems may employ different chunk sizes or may support variable chunk sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain 100 instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

In many deduplication systems, file maps are stored on network-accessible storage systems to keep track of data chunks and references corresponding to shared data files. Each file map represents a file. In some deduplication based systems, a file map is a hidden indirection of a file which contains references to actual data chunks. This indirection helps to eliminate the need to store duplicate chunks. When shared files are altered or edited, the corresponding file map on the network-accessible storage systems is overwritten, which results in changes to such file map. Back up, or replication, of these overwritten files involves transfer of the entire file map, which can consume unnecessarily large amounts of storage space. For example, with an average chunk size of 32 KB and file map entry size of 64 KB, a 1 TB file will have approximately 2 GB of file map. Thus, even a small overwrite will result in a minimum transfer of 2 GB. In the case of overwritten files, transfer of the entire file map is unnecessary as only a fraction of the file map might have been changed.

In addition, because the file map on the target storage system gets overwritten completely during back up, a typical back up will result in unnecessary reference count updates for duplicate chunks.

In some systems, replication of a file can start after multiple writes/overwrites because of schedule restrictions and/or resource constraints. While replication of a file is partial or in progress, there is no guarantee that a restore function call at the target would result in a snapshot/version of the file that was present on source at some instance in time. This is because replication writes files in offset order on the target. Thus, there is a need for optimized methods and systems for performing replication and overwrites in a data deduplication system.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide techniques or mechanisms for creating efficient and consistent replication of file overwrites. According to various embodiments, a file map with a sequence file number is created for a data file on a source. The file map includes one or more nodes that each includes a sequence node number. When an entry in the file map is changed, the sequence file number is incremented, and the corresponding node is updated by, among other things, setting the sequence number of the node (sequence node number) to equal the current sequence file number. All other nodes in the file map that point to the updated node are similarly updated. When replication occurs, only the updated nodes in the file map are replicated and any unreplicated non-updated nodes are maintained.

According to various embodiments, the file map may be organized in the form a tree data structure, such as a B+ tree implementation. However, other tree based implementations can be used as well.

In another embodiment, a replication sequence number exists, which corresponds to the number of successful replications at the target. Replication only occurs for updated nodes with a sequence node number greater than the replication sequence number. In a further embodiment, the replication sequence number is updated only after completion of a successful replication of the data file at the target by setting it equal to the current sequence file number upon successful replication of the data file at the target.

In some implementations, a read only copy of the file map is maintained at the target during replication. In some embodiments, a change in the entry of the file map corresponds to a change in pages of the file map. In some embodiments, updates to reference counts utilized in deduplication are proportional to the number of file map pages that have been changed, rather than the total size of the file map.

BRIEF DESCRIPTION OF THE DRAWINGS

The disclosure may best be understood by reference to the following description taken in conjunction with the accompanying drawings, which illustrate particular embodiments of the present disclosure.

DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques and mechanisms of the present disclosure will be described in the context of particular data storage mechanisms. However, it should be noted that the techniques and mechanisms of the present disclosure apply to a variety of different data storage mechanisms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a file map with a sequence file number is created for a data file on a source. The file map includes one or more nodes that are numbered by a sequence node number. Each node is connected to at least one other node. A node may represent one or more pages of a data file map. When an entry in the file map is changed, the sequence file number is incremented to a current sequence file number, and the corresponding node is updated by, among other things, setting the sequence node number to equal the current sequence file number. All other nodes in the file map that point to the updated node are similarly updated. When replication occurs, only the updated nodes in the file map are replicated and any unreplicated non-updated nodes are maintained.

Example Embodiments

According to various embodiments, data at a client device may be transmitted to a networked storage system for storage. At least some of the data may be stored on the networked storage system in a deduplicated state.

In some implementations, data may be deduplicated by first dividing a data stream into chunks using a parser and then computing a fingerprint for each chunk using a fingerprinting algorithm. In some embodiments, a fingerprinting algorithm is a procedure that maps an arbitrarily sized data item (such as a chunk of data) to a much shorter bit string, its fingerprint. This fingerprint may be used to identify the original data, just as human fingerprints uniquely identify people. This fingerprint may be used for data de-duplication purposes. For instance, the fingerprint may be used to quickly determine whether a data chunk is already stored on a storage system.

In some instances, data may be deduplicated at the networked storage system. For instance, the networked storage system may review data to determine whether it matches other data stored on the storage system. When a duplicate is found, the networked storage system may eliminate duplicate data chunks and update a reference count to track the number of copies of the duplicated data.

According to various embodiments, data may be deduplicated at the client device. For instance, a data stream designated for storage on the networked storage system may be parsed at the client device using the same parser that exists on the networked storage device. The parser may break the data stream into one or more data chunks, which may be fingerprinted using the same fingerprinter that is used at the networked storage system. The client device may then consult with the networked storage system to determine whether a chunk is already stored at the networked storage system before transmitting the chunk over the network. For instance, the client device may communicate with the networked storage system via custom communications protocol semantics associated with a custom communications protocol.

As previously mentioned, in some embodiments, client operations located on a source storage are replicated directly on to a target storage. However, in some embodiments, this process requires a significant amount of book-keeping of information on the replication source and makes it difficult to identify and merge/purge operations at duplicate or overlapping offsets. For replication of overwritten files, in some embodiments, it is only necessary to transfer changed entries in the file map from the source to the target. However, in such embodiments, this may involve tracking changes at the entry level and also requires a significant amount of book-keeping of information. In some embodiments, changes are tracked for a group of entries (i.e., a page) in the file map. In such embodiments, the identification of all changed pages in the file map is proportional to the change in the file map rather than the total size of the file map.

In certain embodiments, a file map may be represented by a B+tree implementation. In other embodiments, any tree based implementation or linked list implementation may also be used. In some embodiments, a node in the tree represents one or more pages of the file map. In some embodiments, each data file or file map has a sequence number associated with it. In such embodiments, subsequent edits or writes to the data file will increment the sequence number of the file and the same is propagated to the sequence numbers of all nodes or pages in the tree corresponding to the edits or writes. In some embodiments, when replication of a file is successful, the source records the current sequence number of the file as a replication sequence number. In some embodiments, for subsequent replication of the file, the source will transfer to the target only those pages that have a greater sequence number than the recorded replication sequence number. In some embodiments, the source will transfer to the target only those pages corresponding to a node having a greater sequence number than the recorded replication sequence number. For example, let S represent the sequence number of a node, $S_{file}$ represent the sequence number of the file, and $RS_{file}$ represent the replication sequence number of the file ($S_{file}$ at last successful replication). In such an example, all nodes in the file map's B+tree where $S>RS_{file}$ is replicated.

In some embodiments, the sequence file number is maintained on internal nodes in the tree in order to avoid traversing unchanged paths in the tree. In such embodiments, this results in faster identification of changed file map pages. In some embodiments, the sequence number of an internal node or root will always be greater than or equal to sequence numbers of any of its descendant nodes. In some embodiments, sequence numbers at file level are used for resynchronization purposes.

In some embodiments, because the source sends only changed file map pages to the target, this will result in overwrite of only changed pages of the file map. In such embodiments, the amount of reference count updates is thus proportional to the number of changed file map pages.

In certain embodiments, when replication of a file is in progress or partial, reads to that file should return a previous version of the file consistent with an older version of the file on the source. In such embodiments, a read-only view of the file containing older data is thus maintained while replication is in progress, with references to older chunks remaining until replication is completed. According to one or more embodiments, at the start of replication, a copy of the root node is created, thereby creating a new tree, but the rest of the nodes in the new tree are shared with the original root node. In some embodiments, any update to a leaf node or internal node in the tree at the source will result in a new leaf or internal node created at the target during replication, as well as corresponding new parent nodes leading up to the copied root node. In some embodiments, any unchanged nodes are shared between trees. Effectively, in some embodiments, there are two roots in the tree while replication is in progress: one to serve read requests and the other for writes from replication. In some embodiments, when replication of the file is successfully completed, the copy of the root node replaces the original root node and the original root node and orphan nodes (nodes referenced only by the original root node) can be freed and subsequently deleted. In some embodiments, rollback involves performing the same process on the new root node. In some embodiments, new and older changed nodes are tracked to avoid traversal at the end of replication or rollback.

According to various embodiments, techniques and mechanisms are described herein with respect to deduplication applications. However, the techniques and mechanisms described are applicable to a wide variety of contexts. For instance, the techniques and mechanisms described herein are applicable to any area in which it is desired to produce stronger fingerprints or hash values while not appreciably increasing the usage of computing resources.

Figure 1:
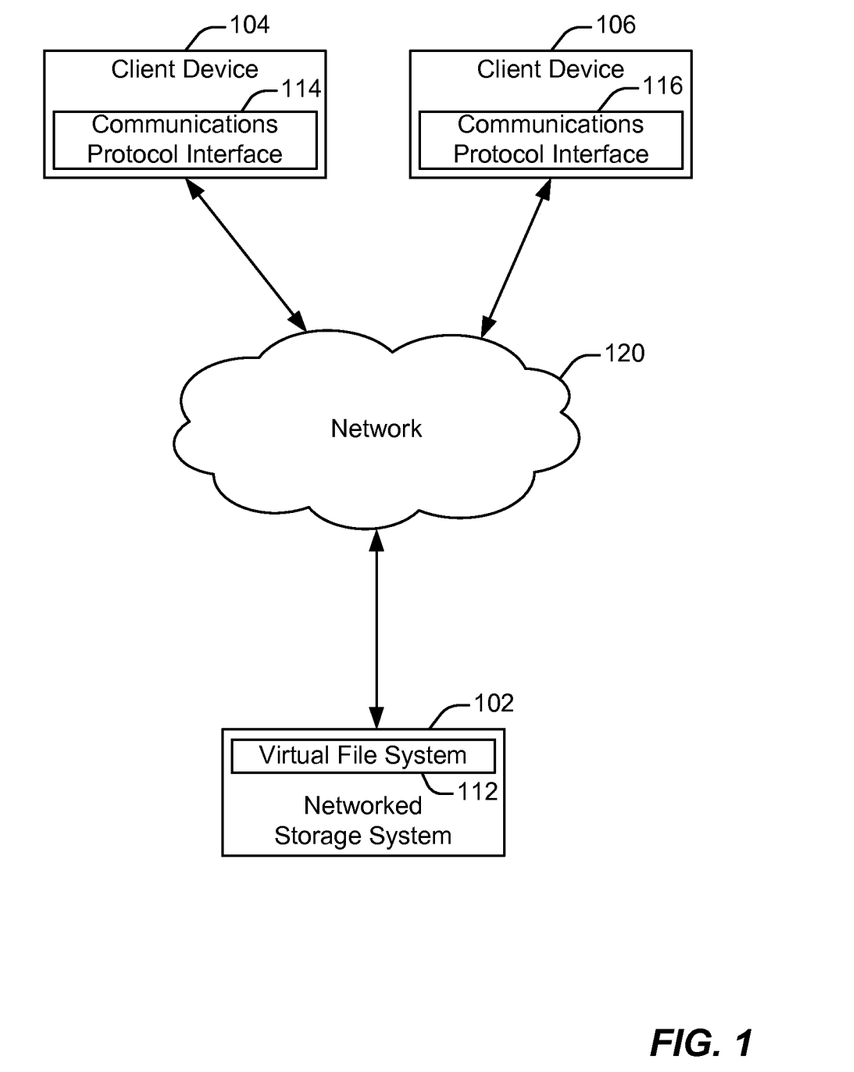
FIG. 1 shows an example of a network storage arrangement, arranged in accordance with one or more embodiments.

FIG. 1 shows an example of a network storage arrangement, arranged in accordance with one or more embodiments. The network storage arrangement shown in FIG. 1 includes a networked storage system 102 in communication with client devices 104 and 106 via a network 120. The client devices are configured to communication with the networked storage system 102 via the communications protocol interfaces 114 and 116. The networked storage system 102 is configured to process file-related requests from the client devices via the virtual file system 102.

According to various embodiments, the client devices and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage.

In some implementations, the networked storage system 102 may be any network-accessible device or combination of devices configured to store information received via a communications link. For instance, the networked storage system 102 may include one or more DR4000 or DR6000 storage appliances provided by Dell Computer of Round Rock, Tex. Although FIG. 1 shows one networked storage system, other network storage arrangements may include any number of networked storage systems. For instance, corporate networks often include many networked storage systems in communication with client devices and/or other networked storage systems through a network 120. In other embodiments, such multiple networked storage systems may by in direct communication with client devices and/or other networked storage systems through direct communications links.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link.

According to various embodiments, each of the client devices 104 and 106 may be any computing device configured to communicate with the networked storage system 102 via a network or other communications link. For instance, a client device may be a desktop computer, a laptop computer, another networked storage system, a mobile computing device, or any other type of computing device. Although FIG. 1 shows two client devices, other network storage arrangements may include any number of client devices. For instance, corporate networks often include many client devices in communication with the same networked storage system.

According to various embodiments, the client devices may communicate with the networked storage system 102 via the communications protocol interfaces 114 and 116. Different client devices may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client device may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client device may communicate with a networked storage system using the CIFS protocol. CIFS operates as an application-layer network protocol. CIFS is provided by Microsoft of Redmond Wash. and is a stateful protocol.

In some embodiments, a client device may communicate with a networked storage system using the OST protocol provided by NetBackup.

In some embodiments, different client devices on the same network may communicate via different communication protocol interfaces. For instance, one client device may run a Linux-based operating system and communicate with a networked storage system via NFS. On the same network, a different client device may run a Windows-based operating system and communicate with the same networked storage system via CIFS. Then, still another client device on the network may employ a NetBackup backup storage solution and use the OST protocol to communicate with the networked storage system 102.

According to various embodiments, the virtual file system layer (VFS) 102 is configured to provide an interface for client devices using potentially different communications protocol interfaces to interact with protocol-mandated operations of the networked storage system 102. For instance, the virtual file system 102 may be configured to send and receive communications via NFS, CIFS, OST or any other appropriate protocol associated with a client device.

In some implementations, the network storage arrangement shown in FIG. 1 may be operable to support a variety of storage-related operations. For example, the client device 104 may use the communications protocol interface 114 to create a file on the networked storage system 112, to store data to the file, to commit the changes to memory, and to close the file. As another example, the client device 106 may use the communications protocol interface 116 to open a file on the networked storage system 102, to read data from the file, and to close the file.

In particular embodiments, a communications protocol interface 114 may be configured to perform various techniques and operations described herein. For instance, a customized implementation of an NFS, CIFS, or OST communications protocol interface may allow more sophisticated interactions between a client device and a networked storage system.

According to various embodiments, a customized communications protocol interface may appear to be a standard communications protocol interface from the perspective of the client device. For instance, a customized communications protocol interface for NFS, CIFS, or OST may be configured to receive instructions and provide information to other modules at the client device via standard NFS, CIFS, or OST formats. However, the customized communications protocol interface may be operable to perform non-standard operations such as a client-side data deduplication.

Figure 2:
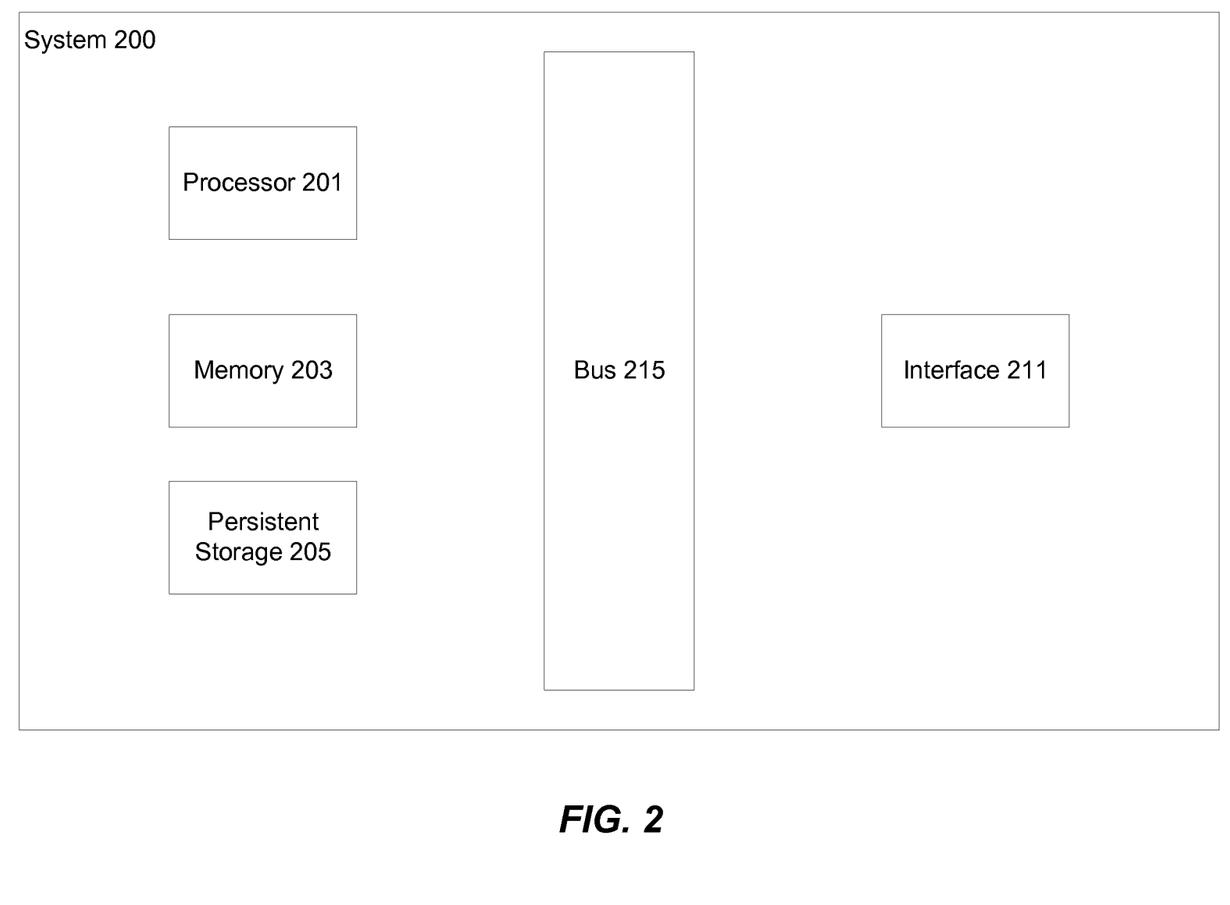
FIG. 2 illustrates a particular example of a system that can be used in conjunction with the techniques and mechanisms of the present disclosure.

FIG. 2 illustrates a particular example of a system that can be used in conjunction with the techniques and mechanisms of the present disclosure. According to particular example embodiments, a system 200 suitable for implementing particular embodiments of the present disclosure includes a processor 201, a memory 203, an interface 211, persistent storage 205, and a bus 215 (e.g., a PCI bus). For example, the system 200 may act as a client device such as the client device 104 or the client device 106 shown in FIG. 1. When acting under the control of appropriate software or firmware, the processor 201 is responsible for such tasks such as generating instructions to store or retrieve data on a remote storage system. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid-state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 200 uses memory 203 to store data and program instructions for operations such as fingerprint generation. The program instructions may control the operation of an operating system and/or one or more applications, for example. The memory or memories may also be configured to store received metadata and batch requested metadata. In some embodiments, the system 200 may act as a networked storage system such as the networked storage system 102 shown in FIG. 1.

Figure 3:
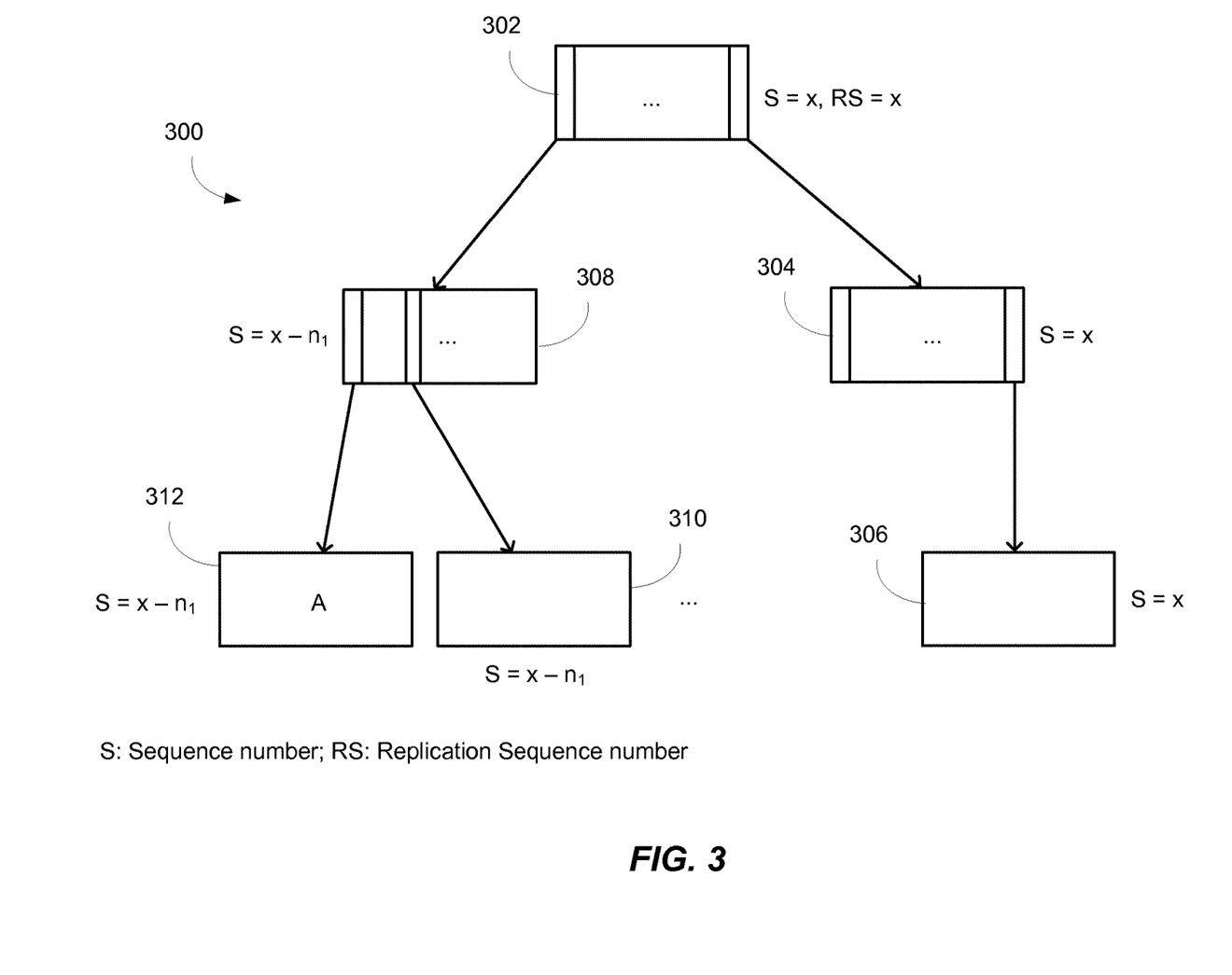
FIG. 3 is a block diagram illustrating an example tree implementation of a file map in accordance with one or more embodiments.

FIG. 3 is a block diagram illustrating an example tree implementation of a file map stored on a source before overwrite in accordance with one or more embodiments. File map 300 in FIG. 3 includes root node 302 and nodes 304, 306, 308, 310, and 312. Root node 302 has sequence number, S=x, and replication sequence number, RS=x. The sequence number, S, is updated and incremented after each overwrite is implemented in the file map. The replication sequence number, RS, is updated to equal the updated sequence number only after successful replication of the data file at a target. Root node 302 points to node 304, which in turn points to node 306. Nodes 304 and 306 each have sequence number, S=x. Root node 302 also points to node 308, which in turn points to nodes 310 and 312. Nodes 308, 310, and 312 each have sequence node number $S=x-n_1$. In some embodiments, the sequence node number may be stored at each node, including the root node. In some embodiments, the sequence node numbers may be different among nodes. According to various embodiments, file map 300 may be stored on a source within a network-accessible or network-attached storage system. In various embodiments, root node 302 and nodes 304, 306, 308, 310, and 312 may contain chunks or portions of chunks of data organized as bits, bytes, pages, etc. Node 312 contains a particular entry, or chunk, marked A.

In this particular example, the nodes with sequence number S=x (nodes 302, 304, and 306) represent the most recently updated nodes affected by the most recent overwrite. By contrast, the nodes with sequence number $S=x-n_1$ (308, 310, and 312) represent nodes that have not been affected by the most recent overwrite.

In certain embodiments, file map 300 may be associated with a sequence file number, $S_{file}=x$, which is updated and incremented after each overwrite, or change of an entry, is implemented in the file map. In certain embodiments, file map 300 may be associated with the replication sequence number, RS=x, which is similarly updated after each successful replication of the data file at a target.

Figure 4:
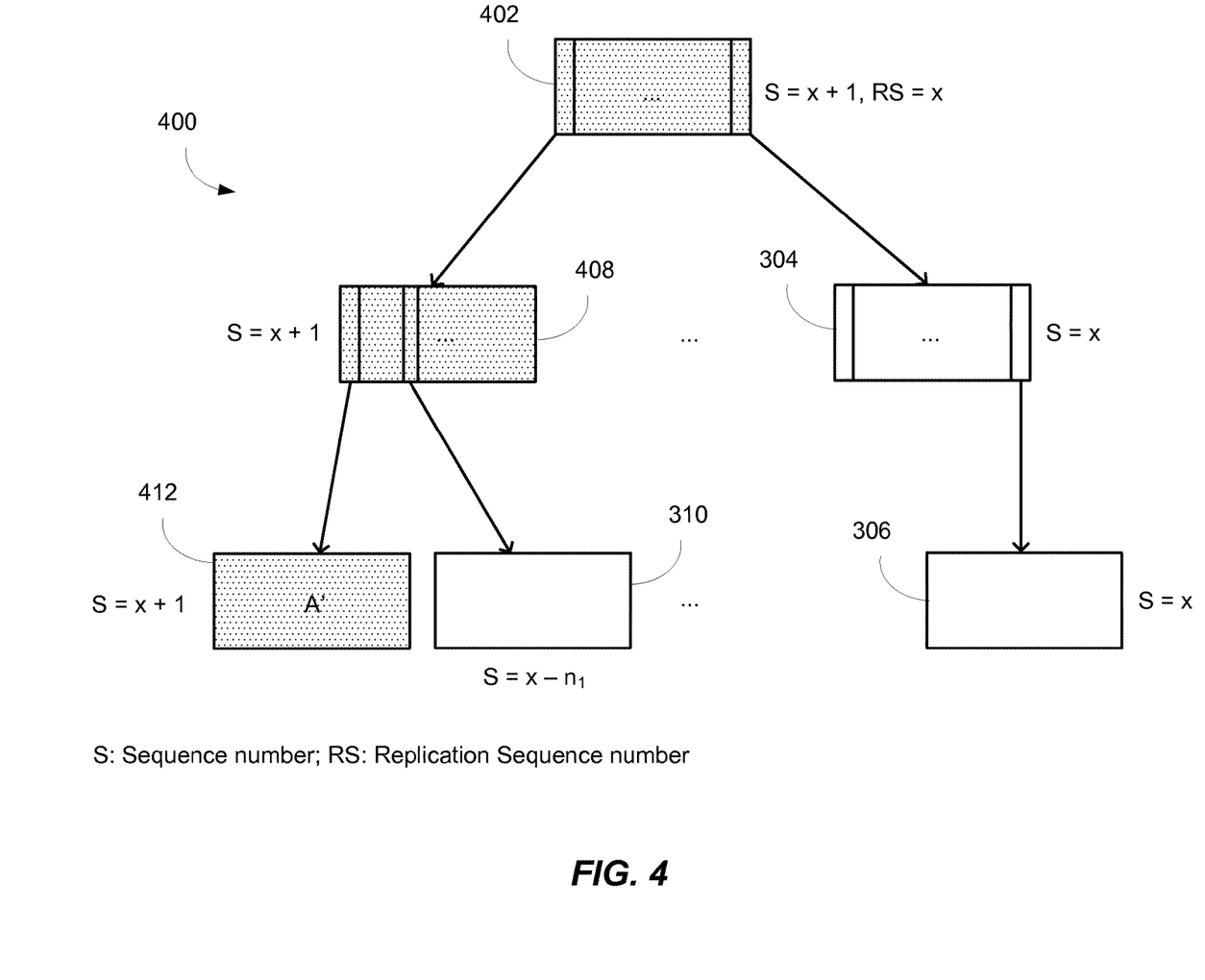
FIG. 4 is a block diagram illustrating an example tree implementation of a file map with updated nodes in accordance with one or more embodiments.

FIG. 4 is a block diagram illustrating an example tree implementation of a file map with updated nodes on a source in accordance with one or more embodiments. The file map 400 in FIG. 4 includes updated root node 402, updated nodes 408 and 412, and nodes 304, 306, and 310. Nodes 304, 306, and 310 in FIG. 4 are identical to nodes 304, 306, and 310 in FIG. 3, and remain unchanged in FIG. 4. Updated root node 402 points to updated node 408, which in turn points to updated node 412 and node 310. Updated root node 402 also points to node 304, which in turn points to node 306.

FIG. 4 represents an example file map on a source after an overwrite, according to embodiments in the present disclosure, reflected by the change from chunk/entry A in node 312 of FIG. 3 to chunk/entry A' in node 412. Once the change has been implemented, node 412 is updated to have a sequence number, S=x+1, which represents the new current sequence node number, and each node that points to node 412, directly and indirectly, is similarly updated to have a sequence number, S=x+1. Thus, in the example, updated node 408 and updated root node 402 also reflect a sequence number, S=x+1. Nodes 304, 306, and 310 do not point to updated node 412 and remain unchanged. Thus, the sequence number of node 310 remains $S=x-n_1$, and the sequence numbers for nodes 304 and 306 each remain at S=x. Note that the replication sequence number for updated root node 402 remains at RS=x because no replication has yet occurred at a target after the sequence number incremented to x+1.

In certain embodiments file map 400 is associated with a sequence file number, $S_{file}$, which is incremented once an overwrite is implemented. In the particular example depicted in FIG. 4, file map 400 would have a sequence file number, $S_{file}=x+1$, because the sequence file number updates when an overwrite or a change in entry occurs. In certain other embodiments, file map 400 is associated with a replication sequence number, RS. The replication sequence number of file map 400 remains RS=x because no replication has yet occurred at a target after the sequence number incremented to x+1.

Figure 5:
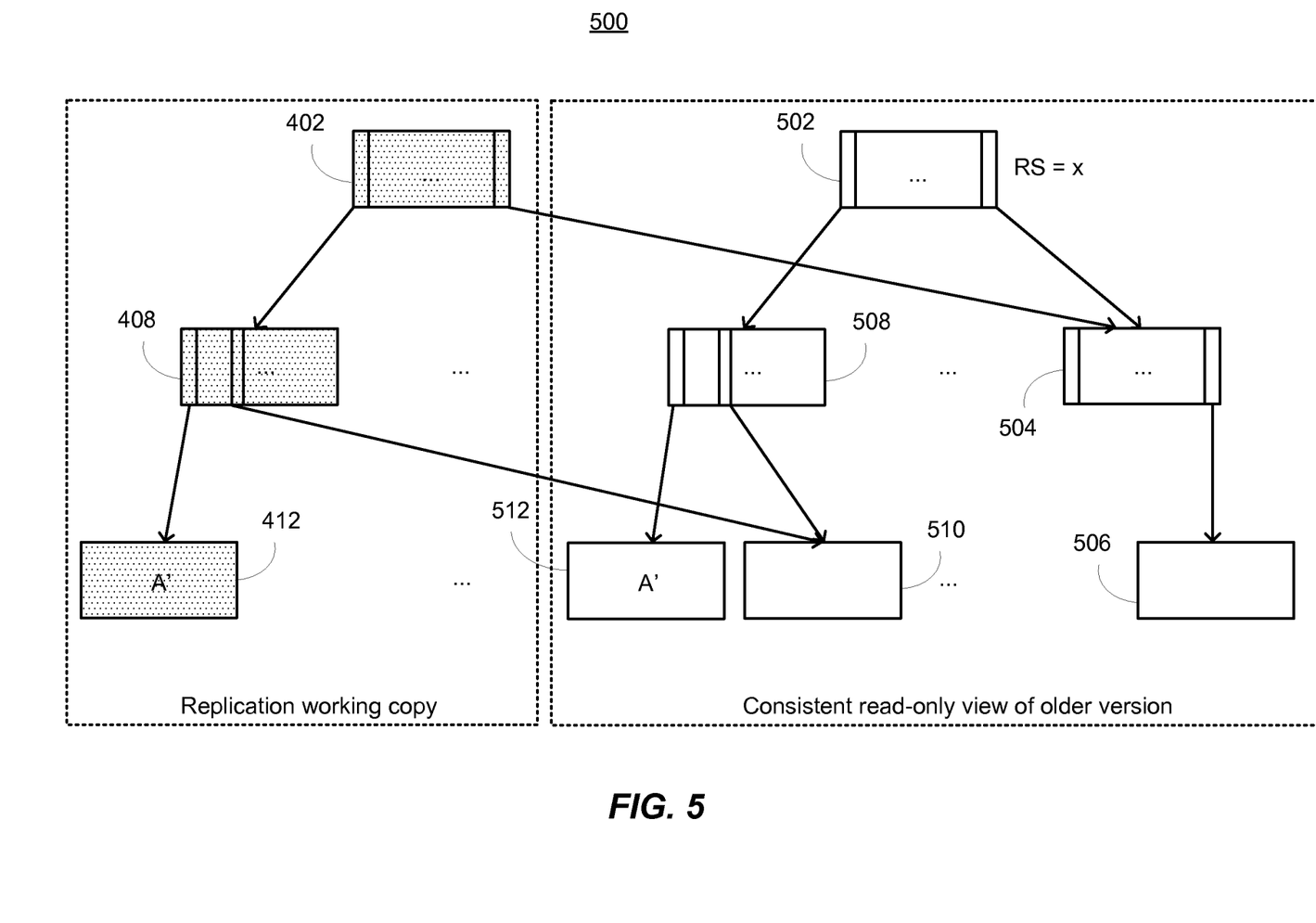
FIG. 5 is a block diagram illustrating an example tree implementation of a file map during replication at a target in accordance with one or more embodiments.

FIG. 5 is a block diagram illustrating an example tree implementation of a file map during replication at a target storage in accordance with one or more embodiments. The file map 500 in FIG. 5 includes updated root node 402, updated nodes 408 and 412, root node 502, and nodes 504, 506, 508, 510, and 512. Root node 502 and nodes 504, 506, 508, 510, and 512, which are located on the target, are identical copies of root node 302 and nodes 304, 306, 308, 310, and 312 from FIG. 3, which are located on the source.

In the example replication depicted in FIG. 5, only the updated nodes 402, 408, and 412 are sent from the source for replication at the target. In certain embodiments, only updated nodes with a sequence number greater than replication sequence number are replicated (S>RS). Once updated nodes 402, 408, and 412 have been transferred to target, new pointers are connected from the updated nodes to the identical non-updated, unaffected nodes in file map 500 that the updated nodes pointed to in file map 400. In this particular example, as depicted in FIG. 5, a new pointer connects updated root node 402 to node 504, and a new pointer connects updated node 408 to node 510. As used herein, the term "unaffected nodes" refers to nodes that are not updated or contain pointers pointing to updated nodes. "Unaffected nodes," as used herein, can also refer to non-updated nodes that have new pointers from updated nodes pointing to the non-updated nodes.

In certain embodiments, reads to a file currently being replicated will return a previous version of the file on the target consistent with an older version of the file on the source. In some embodiments, non-updated nodes 502, 508, and 512 corresponding to transferred updated nodes 402, 408, and 412 are maintained on the target, with all pointers being intact, and provide the consistent read-only view of the older version of the data file while replication of the data file is in progress or partial. In another embodiment, a copy of the root node is separately created in file map 500 and the rest of the file map nodes are then shared with the original root node. Any node at the target being replaced is also copied. Any unchanged nodes are shared between trees. In the example depicted in FIG. 5, the replicated nodes (402 and 408) point to the same unaffected nodes (504 and 510) to which their respective non-updated versions (502 and 508) are pointed.

Figure 6:
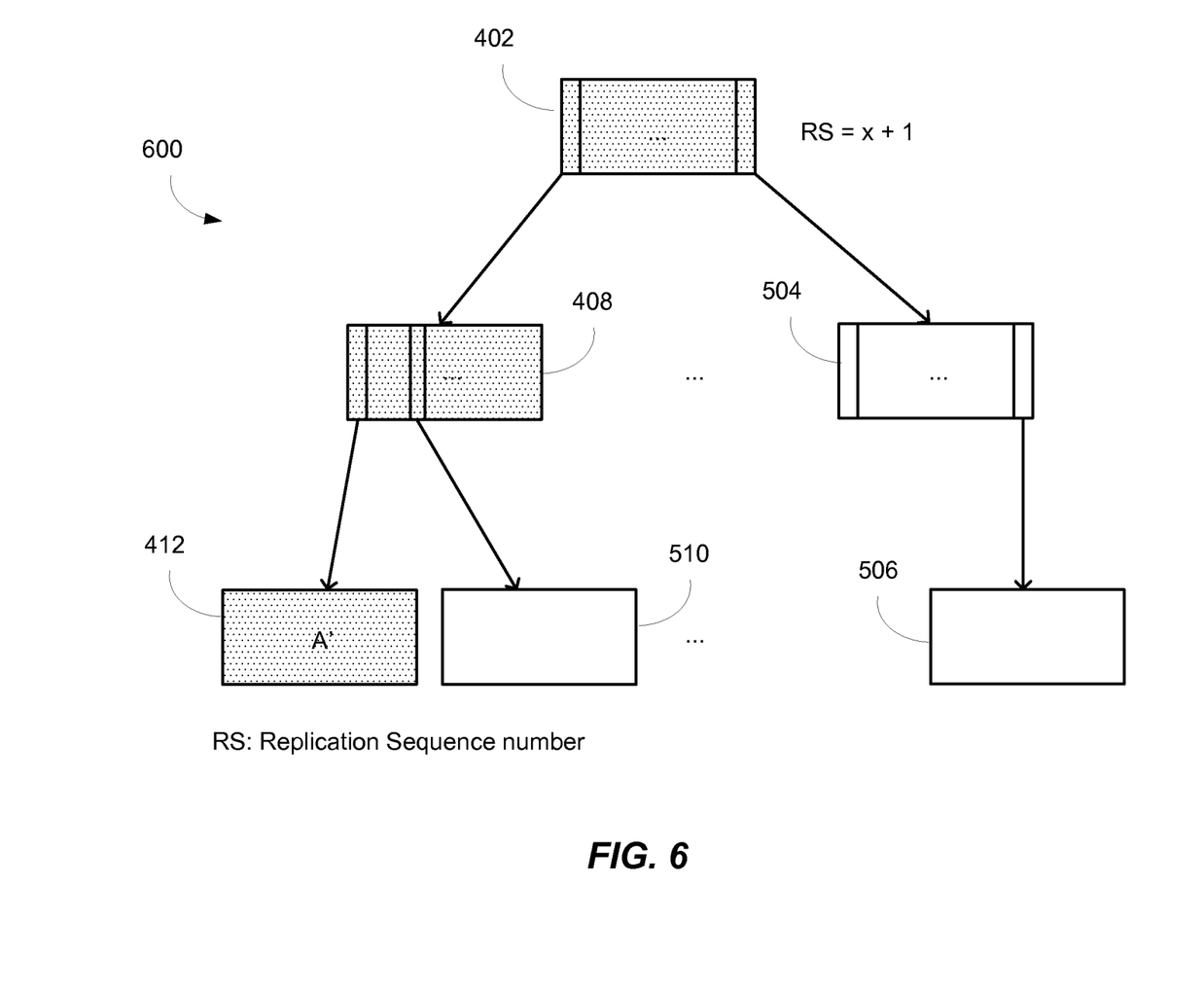
FIG. 6 is a block diagram illustrating an example tree implementation of a file map after successful replication at a target in accordance with one or more embodiments.

FIG. 6 is a block diagram illustrating an example tree implementation of a file map after successful replication at a target in accordance with one or more embodiments. File map 600 includes updated root node 402, updated nodes 408 and 412, and unaffected nodes 504, 506, and 510. When replication of the data file is successfully completed, updated root node 402 and updated nodes 408 and 412 replace original nodes 502, 508 and 512, which are then freed/orphaned and possibly erased from the target. An identical copy of the overwritten file map 400 from the source is now at the target as file map 600. The replication sequence number of root node 402 is updated from RS=x to RS=x+1 after successful replication of the data file.

In certain embodiments, the sequence number of each updated nodes is maintained. In FIG. 6, the sequence number of root node 402, and nodes 408 and 412, are S=x+1. In other embodiments, the sequence file number, $S_{file}$, of file map 600 is updated to $S_{file}$=x+1. In certain embodiments, the replication sequence number is updated to equal the sequence number, S, of root node 402 (RS=S=x+1). In other embodiments, the replication sequence number is updated to equal the sequence file number, $S_{file}$, of file map 600 (RS=$S_{file}$=x+1).

Figure 7:
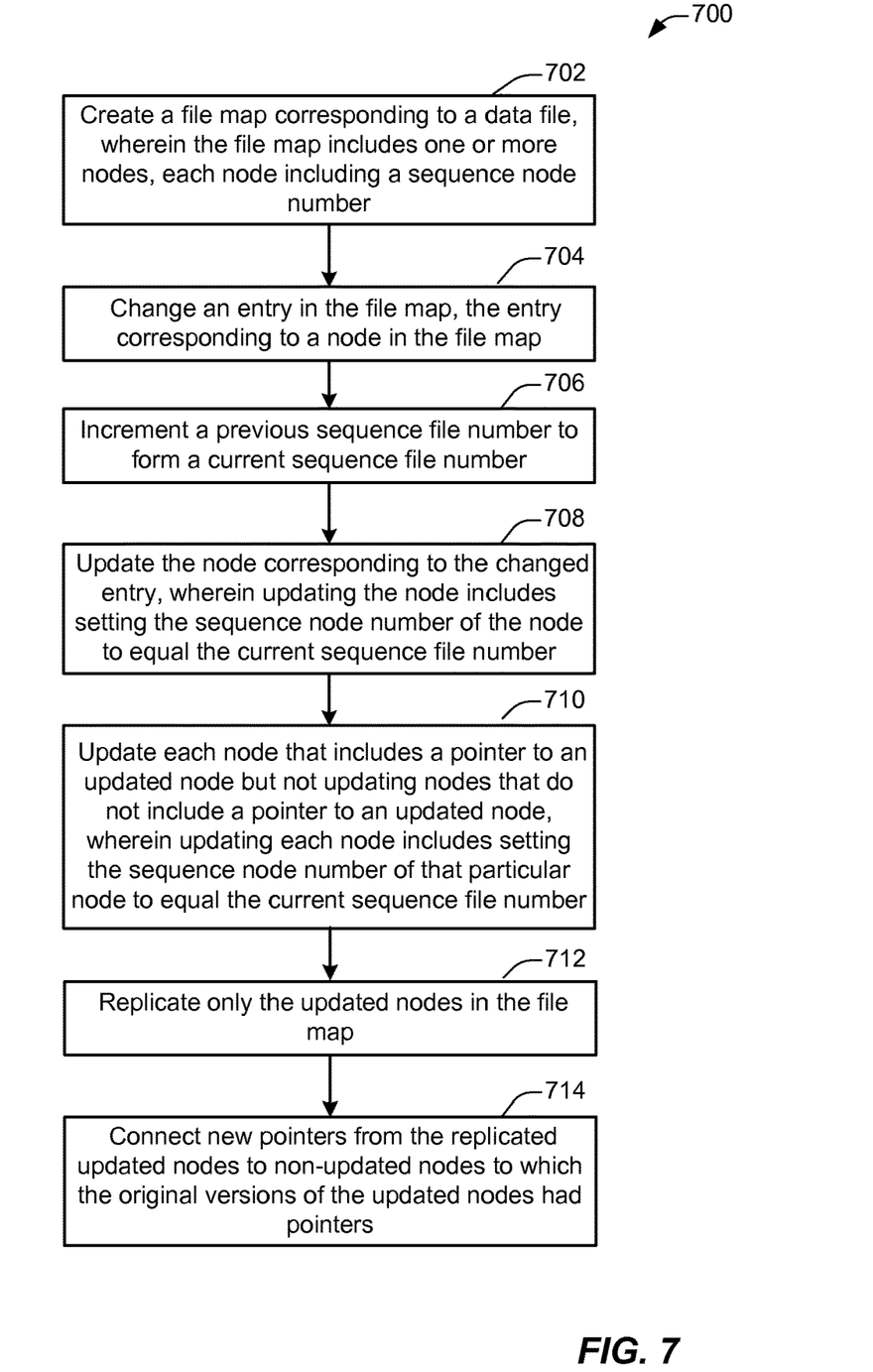
FIG. 7 illustrates an example of a method for optimized replication of an updated data file at a target in accordance with one or more embodiments.

FIG. 7 illustrates an example of a method 700 for optimized replication of an updated data file at a target in accordance with one or more embodiments. The method 700 may be performed at a networked storage system such as system 102 shown in FIG. 1. The method 700 may alternatively be performed at a networked client device such as the devices 104 and 106 shown in FIG. 1.

At 702, a file map is created at a source that corresponds to a data file. For example, file map 300 as shown in FIG. 3 is a file map created for a data file on a source. According to various embodiments, file map 300 may be stored on a source within a network-accessible or network-attached storage system. In another embodiment, file map 300 may be stored on a source within a client device such as the devices 104 and 106 shown in FIG. 1. The created file map includes one or more nodes, each node including a sequence node number. For example file map 300 includes root node 302 and nodes 304, 306, 308, 310, and 312. Nodes 302, 304, and 306 contain sequence number, S=x, as a sequence node number. Furthermore nodes 308, 310 and 312 contain sequence number, S=x−n1, as a sequence node number. In various embodiments, root node 302 and nodes 304, 306, 308, 310, and 312 may contain entries, chunks or portions of chunks of data organized as bits, bytes, pages, etc.

At 704, a change in an entry in the file map, corresponding to a node in the file map, is implemented. In some embodiments, subsequent writes and overwrites to a data file change entries in the file map. For example, chunk/entry A in node 312 in FIG. 3 was changed to chunk/entry A' in node 412 in FIG. 4. A change in an entry can occur in any number of nodes in the file map. In some embodiments, a change can occur to an entire entry or a portion of an entry, e.g. a chunk of data. In some embodiments, a change can occur to several entries in the same node or in different nodes.

At 706, a sequence file number is incremented after a change in an entry has been implemented. For example, in an embodiment, the sequence file number of file map 400 was updated from $S_{file}$=x to $S_{file}$=x+1 after the entry change to A' is implemented. At 708, the node corresponding to the changed entry is updated by setting the sequence node number of the node to equal the current sequence file number. For example, in an embodiment, the sequence node number of node 412 in FIG. 4 is updated by setting the sequence number of node 412 to equal the sequence file number of file map 400, such that S=x−$n_1$ changes to S=$S_{file}$=x+1 after the entry change to A' is implemented. In certain embodiments, step 706 is skipped and the sequence node number is directly updated by incrementing its previous value. For example, instead of setting the sequence number of node 412 to equal the sequence file number of file map 400, the sequence number of node 412 is directly incremented to S=x+1, if the previous sequence node number as S=x, without reference to the sequence file number of file map 400.

At 710, each node that includes a pointer to an updated node is updated, but nodes that do not include a pointer to an updated node are not updated. In some embodiments with tree implementations of file maps, this translates to updates propagating "up" the tree from the node containing the changed entry, all the way to the root node. Updating nodes in step 710 includes setting the sequence node number of the node to equal the current sequence file number. For example, in an embodiment, the sequence node number of node 408 is updated in FIG. 4 because node 408 points to updated node 412. Thus, the sequence node number of node 408 is updated by setting the sequence number of node 408 to equal the sequence file number of file map 400, such that S=x−$n_1$ changes to S=$S_{file}$=x+1. Root node 402 in FIG. 4 is similarly updated because root node 402 points to updated node 408, except that S=x, rather than S=x−$n_1$, changes to S=$S_{file}$=x+1. In certain embodiments, nodes pointing to updated nodes are updated without reference to the sequence file number. For example, the sequence node numbers of root node 402 and node 408 may be updated by directly incrementing the sequence numbers of root node 402 and node 408 to S=x+1. In some embodiments, because the updates always propagate up the tree, then each changed entry results in an update to the root node. In such embodiments, changes to groups of nodes or groups of pages in a file map are tracked easily without excessive bookkeeping.

At 712, only the updated nodes in the file map are replicated. In certain embodiments the updated nodes are replicated and transferred to a target. In certain embodiments, the target may even be located on the same storage device as the source. In various embodiments a target may be located in a networked storage system, such as system 102 as shown in FIG. 1. In another embodiment, the target may be located within a client device such as the devices 104 and 106 shown in FIG. 1. For example in FIG. 5, updated root node 402 and updated nodes 408 and 412 from file map 400 on a source have been sent to a target for replication. In some embodiments, both source and target storage systems are virtual storage systems.

At 714, new pointers are connected from the replicated updated nodes to non-updated nodes to which the original versions of the updated nodes had pointers. In certain embodiments, the non-updated nodes or unaffected nodes to be connected are located at the target and are identical to non-updated or unaffected nodes at the source. For example, in an embodiment in FIG. 5, a new pointer is connected from the replicated updated root node 402 to the non-updated or unaffected node 504 on the target because node 504 is identical to non-updated node 304 to which the original version node 302 (non-updated version of updated node 402) originally pointed. As mentioned above, the term "unaffected node" may refer to any node not "affected" by overwrites or replications (new pointers pointing to the "unaffected nodes" do not count as "affecting" the node for the purposes of this disclosure). For example, node 304 in FIG. 4 is an unaffected node (unaffected by the overwrite depicted in FIG. 4) and node 504 in FIG. 6 is also an unaffected node (unaffected by the replication depicted in FIG. 6). As used herein, the term "original versions" refers to prior (or immediately prior) versions of nodes that have been affected/updated by overwrites and replications. For example, nodes 308 and 508 are both nodes that are original versions of updated node 408.

In some embodiments, the file map is represented as a tree data structure. In some embodiments, only the updated nodes with a sequence node number greater than a replication sequence number are replicated, wherein the replication sequence number corresponds to the number of successful replications at a target. In some embodiments, the method further comprises updating the replication sequence number only after completion of a successful replication at the target, wherein updating the replication sequence number includes setting the replication sequence number to equal the current sequence file number upon successful replication of the data file at the target. In some embodiments, a read only copy of the file map is maintained at the target for read requests during replication, the read only copy corresponding to the version of the file map immediately before replication begins. In some embodiments, changing the entry corresponds to changing a number of file map pages in the file map. In some embodiments, updates to reference counts utilized in data deduplication are proportional to the number of file map pages that have been changed.

Because various information and program instructions may be employed to implement the systems/methods described herein, the present disclosure relates to non-transitory machine-readable media include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher-level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure.

What is claimed is:

1. A method comprising:
creating a file map to track data chunks and at least one pointer to a data file, wherein the file map includes one or more nodes, each node including a sequence node number;
changing an entry associated with a data chunk of the data file in the file map, the entry corresponding to a node in the file map, the data chunk being stored at the node;
incrementing a previous sequence file number for the file map to form a current sequence file number for the file map;
updating the node corresponding to the changed entry, wherein updating the node includes setting the sequence node number of the node to equal the current sequence file number;
updating each node that includes a pointer to the data chunk being stored at the node, wherein updating each node includes setting the sequence node number of that particular node to the current sequence file number;
replicating the updated nodes in the file map and refraining from replicating non-updated nodes, wherein a respective sequence node number of the non-updated nodes are not equal to the current sequence file number, wherein a first non-updated node has a first sequence node number, wherein a second non-updated node has the first sequence node number, wherein the first sequence node number is not equal to the current sequence file number;
connecting new pointers from the replicated updated nodes to the non-updated nodes to which the original versions of the updated nodes had pointers.

2. The method of claim 1, wherein the file map is represented as a tree data structure.

3. The method of claim 1, wherein only the updated nodes with a sequence node number greater than a replication sequence number are replicated, wherein the replication sequence number corresponds to the number of successful replications at a target.

4. The method of claim 3, further comprising updating the replication sequence number only after completion of a successful replication at the target, wherein updating the replication sequence number includes setting the replication sequence number to equal the current sequence file number upon successful replication of the data file at the target.

5. The method of claim 1, wherein a read only copy of the file map is maintained at the target for read requests during replication, the read only copy corresponding to the version of the file map immediately before replication begins.

6. The method of claim 1, wherein changing the entry corresponds to changing a number of file map pages in the file map.

7. The method of claim 6, wherein updates to reference counts utilized in data deduplication are proportional to the number of file map pages that have been changed.

8. A system, comprising:
a processor;
memory, wherein the memory contains instructions to cause the processor to:
create a file map to track data chunks and at least one pointer to a data file, wherein the file map includes one or more nodes, each node including a sequence node number;
change an entry associated with a data chunk of the data file in the file map, the entry corresponding to a node in the file map, the data chunk being stored at the node;
increment a previous sequence file number for the file map to form a current sequence file number for the file map;
update the node corresponding to the changed entry, wherein updating the node includes setting the sequence node number of the node to equal the current sequence file number;
update each node that includes a pointer to the data chunk being stored at the node, wherein updating each node includes setting the sequence node number of that particular node to the current sequence file number;

replicate the updated nodes in the file map and refrain from replicating non-updated nodes, wherein a respective sequence node number of the non-updated nodes are not equal to the current sequence file number, wherein a first non-updated node has a first sequence node number, wherein a second non-updated node has the first sequence node number, wherein the first sequence node number is not equal to the current sequence file number;

connect new pointers from the replicated updated nodes to the non-updated nodes to which the original versions of the updated nodes had pointers.

9. The system of claim 8, wherein the file map is represented as a tree data structure.

10. The system of claim 8, wherein only the updated nodes with a sequence node number greater than a replication sequence number are replicated, wherein the replication sequence number corresponds to the number of successful replications at a target.

11. The system of claim 10, further comprising updating the replication sequence number only after completion of a successful replication at the target, wherein updating the replication sequence number includes setting the replication sequence number to equal the current sequence file number upon successful replication of the data file at the target.

12. The system of claim 8, wherein a read only copy of the file map is maintained at the target for read requests during replication, the read only copy corresponding to the version of the file map immediately before replication begins.

13. The system of claim 8, wherein changing the entry corresponds to changing a number of file map pages in the file map.

14. The system of claim 13, wherein updates to reference counts utilized in data deduplication are proportional to the number of file map pages that have been changed.

15. A non-transitory computer readable medium containing computer code that, when executed by one or more processors, cause a system to perform operations comprising:

creating a file map to track data chunks and at least one pointer to a data file, wherein the file map includes one or more nodes, each node including a sequence node number;

changing an entry associated with a data chunk of the data file in the file map, the entry corresponding to a node in the file map, the data chunk being stored at the node;

incrementing a previous sequence file number for the file map to form a current sequence file number for the file map;

updating the node corresponding to the changed entry, wherein updating the node includes setting the sequence node number of the node to equal the current sequence file number;

updating each node that includes a pointer to the data chunk being stored at the node, wherein updating each node includes setting the sequence node number of that particular node to the current sequence file number;

replicating the updated nodes in the file map and refraining from replicating non-updated nodes, wherein a respective sequence node number of the non-updated nodes are not equal to the current sequence file number, wherein a first non-updated node has a first sequence node number, wherein a second non-updated node has the first sequence node number, wherein the first sequence node number is not equal to the current sequence file number; and connecting new pointers from the replicated updated nodes to the non-updated nodes to which the original versions of the updated nodes had pointers.

16. The non-transitory computer readable medium of claim 15, wherein the file map is represented as a tree data structure.

17. The non-transitory computer readable medium of claim 15, wherein only the updated nodes with a sequence node number greater than a replication sequence number are replicated, wherein the replication sequence number corresponds to the number of successful replications at a target.

18. The non-transitory computer readable medium of claim 17, further comprising updating the replication sequence number only after completion of a successful replication at the target, wherein updating the replication sequence number includes setting the replication sequence number to equal the current sequence file number upon successful replication of the data file at the target.

19. The non-transitory computer readable medium of claim 15, wherein changing the entry corresponds to changing a number of file map pages in the file map.

20. The non-transitory computer readable medium of claim 15, wherein a read only copy of the file map is maintained at the target for read requests during replication, the read only copy corresponding to the version of the file map immediately before replication begins.

* * * * *